Patented Aug. 14, 1951

2,563,838

UNITED STATES PATENT OFFICE 2,563,838

CONDENSING AROMATIC AMINE THIO-CYANATE WITH AN ALDEHYDE

William H. Hill, Pittsburgh, Pa., assignor to Koppers Company, Inc., Pittsburgh, Pa., a corporation of Pennsylvania No Drawing. Application August 12, 1947, Serial No. 768,273

17 Claims. (Cl. 260—72.5)

This invention relates to methods for effecting condensation of aniline thiocyanate with aldehyde.

This application discloses and claims the subject matter disclosed in my copending application, Serial No. 463,133, filed October 23, 1942, (now Patent No. 2,425,320, granted August 12, 1947) and Serial Number 706,051, filed October 26, 1946, and now abandoned. In these applications there is disclosed and claimed as a new composition of matter the reaction product of an aldehyde and a preformed salt of thiocyanic acid and aniline; in other words, the condensation product of aniline thiocyanate and an aldehyde. It is the primary object of this invention to provide new and improved processes for making this condensation product.

The reaction of aniline thiocyanate with aldehyde is strongly exothermic. This, coupled with the fact that aniline thiocyanate is readily converted to a monophenylthiourea, reduces yields of the desired product, gives it an undesirable physical appearance and in other respects complicates the process. It is an object of this invention to avoid such difficulties.

I have now found that this object is accomplished by bringing aniline thiocyanate and formaldehyde together in aqueous solution while cooling the reaction medium to minimize conversion of aniline thiocyanate to monophenylthiourea.

In carrying out the processes of the invention, one or the other, or both of the reagents may be dissolved in water and one or the other reagent introduced into an aqueous solution of the other while cooling the reaction medium to minimize conversion of the aniline thiocyanate to monophenylthiourea and at a rate sufficiently slow to prevent local overheating. An advantage is obtained by introducing the aniline thiocyanate into the aldehyde solution. Suitably, an aqueous solution of aldehyde and an aqueous solution of aniline thiocyanate are brought together with constant stirring and with cooling sufficient to keep the temperature low enough to prevent or minimize conversion of the aniline thiocyanate to monophenylthiourea.

With properly dilute solutions and with the rate at which the reagents are brought together, properly adjusted, it is possible to obtain satisfactory condensation at relatively high temperatures; say, to as high as about 40° C. It is preferred, however, to carry out the process at substantially lower temperatures, say, at or below about 15° C. because at these temperatures greater leeway is provided with respect to concentration of the reagents and the rate at which they are brought together. Moreover, the product is obtained as a finely divided particulate solid which is easily filtered from the solution and has desirable physical characteristics for packaging and otherwise handling.

The invention may be more fully understood by reference to the following examples in which the parts are by weight unless otherwise specified.

Example I 200 cc. of an aqueous solution of aniline thiocyanate containing about 0.36 mol of aniline thiocyanate was cooled down in a bath of ice and water. While stirring with a mechanical stirrer, 60 grams of 40% formaldehyde solution was slowly added from a dropping funnel. After some time, a plastic ball was formed which broke the stirrer. This plastic ball was light orange in color. It was removed from the reactor and laid aside. Addition of formaldehyde was continued and no more plastic material was formed, but only a brilliantly red granular powder. It was filtered off. The plastic ball in the meantime had softened to a thick flowable liquid which was introduced into the filtrate from the red powder. It hardened immediately and could be broken up into light tan granules. They were filtered off.

The red product (air dried on filter paper) weighed 26 grams. It proved to be thermosetting and had a good flow. The tan material (air dried on filter paper) weighed 42 grams. It also was thermosetting and had a rather stiff flow.

Example II 1940 cc. of an aqueous solution of aniline thiocyanate containing 3.3 mols of the compound, are slowly added to 495 grams (6.6 mols) of a 40% aqueous formaldehyde solution. The mixture is constantly stirred and kept at about 12° C. Slowly a milkiness begins to appear and the color gradually changes to a light yellow due to finely dispersed solid. The color of the solid deepens while the amount increases, until a large quantity of a scarlet colored, finely divided product is produced at the end of the addition of the aniline thiocyanate solution. Filtration and washing with water yields an almost theoretical quantity of the desired aniline thiocyanate formaldehyde condensation product. The new material is a thermosetting resin which, after setting, does not melt at temperatures up to 300 C. and on heating gradually turns brown and then black. It was found to be a good pickling inhibitor.

In place of aniline thiocyanate there may be substituted homologous compounds thereof and in place of formaldehyde there may be substituted other aldehydes. Suitable homologues of aniline thiocyanate include toluidine thiocyanate, xylidine thiocyanate, p-tertiary amyl aniline thiocyanate, alpha naphthylamine thiocyanate, beta naphthylamine thiocyanate, ortho amino diphenyl thiocyanate, etc., and suitable aldehydes include acetaldehyde, crotonaldehyde, butyraldehyde, cinnamic aldehyde, furfural, glyoxal, etc.

In place of adding formaldehyde solution to the aniline thiocyanate solution, the aniline thiocyanate solution may be added to the formaldehyde solution, or the two solutions may be brought together simultaneously in suitable proportions; for example, in the proportions of 2 mols of aldehyde for each mol of aniline thiocyanate. It is not necessary that both reagents be in solution; aniline thiocyanate, for example, may be added directly to an aqueous aldehyde solution and vice versa.

The concentration of the solutions likewise may vary. It is desirable, however, that the reaction be effected in dilute solution. It is desirable to have at least about 2 parts of total water for each part of total reagent. This water may be distributed between the two reagents as desired, keeping in mind the respective solubilities of the aniline thiocyanate and the aldehyde.

Within the scope of the invention there may be included a water-soluble organic solvent such as acetone. The effect of such addition is to cut down the exotherm.

While I have described my invention with reference to particular embodiments, it will be understood that variation may be made, therefore, without departing from the spirit and scope of the invention as set forth herein and in the appended claims.

I claim:
1. In a process for condensing an aldehyde with a pseudomerizable aromatic amine thiocyanate which condenses with the aldehyde in the proportions of two mols of aldehyde for each mol of the aromatic amine thiocyanate with a strong exotherm whereby the heat of the condensation tends to cause the aromatic amine thiocyanate to convert to its pseudomer, the steps of bringing the aromatic amine thiocyanate and the aldehyde together substantially in the proportion in an aqueous medium while cooling the reaction medium to minimize conversion of the aromatic amine thiocyanate to its pseudomer and separating from said aqueous medium and recovering as product the granular material which precipitates therein.

2. The process of claim 1 in which the aromatic amine thiocyanate is selected from the class consisting of aniline thiocyanate and the homologues thereof and in which the reaction mixture is cooled sufficiently to keep the temperature below 40° C.

3. The method of claim 2 in which the reaction mixture is cooled sufficiently to keep the temperature below about 15° C.

4. The method of claim 1 in which both reagents are in aqueous solution when they are brought together.

5. The method of claim 4 in which the aromatic amine thiocyanate is selected from the class consisting of aniline thiocyanate and the homologues thereof and in which the reaction mixture is cooled sufficiently to maintain the temperature below 40° C.

6. The method of claim 1 in which the aldehyde is formaldehyde and the aromatic amine thiocyanate is aniline thiocyanate.

7. The method of claim 6 in which the reaction mixture is cooled sufficiently to maintain a temperature below 40° C.

8. The method of claim 7 in which the reaction mixture is cooled sufficiently to maintain a temperature below about 15° C.

9. The method of claim 1 in which aldehyde is formaldehyde and the aromatic amine thiocyanate is aniline thiocyanate and in which both reagents are in aqueous solution when they are brought together.

10. The method of claim 9 in which the reaction mixture is cooled sufficiently to maintain a temperature below 40° C.

11. In a process for effecting condensation between an aldehyde and an aromatic amine thiocyanate of the formula RNH$_2$.HSCN in which R is an aromatic hydrocarbon radical of the benzene and naphthalene series, the steps of bringing the aromatic amine thiocyanate and the aldehyde together substantially in the proportions of two mols of aldehyde for each mol of aromatic amine thiocyanate in an aqueous medium while cooling the reaction mixture and separating from said aqueous medium and recovering as product the granular material which precipitates therein.

12. The process of claim 11 in which the reaction mixture is cooled sufficiently to maintain a temperature below 40° C.

13. The process of claim 12 in which the aldehyde is formaldehyde and the aromatic amine thiocyanate is aniline thiocyanate.

14. The process of claim 13 in which the reaction mixture is cooled sufficiently to maintain the temeprature below about 15° C.

15. The product obtained by the condensation of an aldehyde with a pseudomerizable aromatic amine thiocyanate according to the process of claim 11 and characterized as a thermosetting resin.

16. The product of claim 15 in which the aldehyde is formaldehyde and the aromatic amine thiocyanate is aniline thiocyanate.

17. The product obtained by the condensation of an aldehyde with a pseudomerizable aromatic amine thiocyanate according to the process of claim 11 characterized as a thermosetting resin.

WILLIAM H. HILL.

REFERENCES CITED

The following references are of record in the file of this patent:

UNITED STATES PATENTS

| Number | Name | Date |
|---|---|---|
| 1,812,749 | Kienle | June 30, 1931 |
| 2,199,155 | Gams | Apr. 30, 1940 |
| 2,425,320 | Hill | Aug. 12, 1947 |